US010698085B2

(12) United States Patent
Okumura et al.

(10) Patent No.: US 10,698,085 B2
(45) Date of Patent: Jun. 30, 2020

(54) NEAR-INFRARED SENSOR COVER

(71) Applicant: TOYODA GOSEI CO., LTD., Kiyosu-shi, Aichi-ken (JP)

(72) Inventors: Koji Okumura, Kiyosu (JP); Shintaro Okawa, Kiyosu (JP); Hiroaki Ando, Kiyosu (JP); Hideto Maeda, Kiyosu (JP); Kimihiro Iimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/357,995

(22) Filed: Mar. 19, 2019

(65) Prior Publication Data
US 2019/0293763 A1 Sep. 26, 2019

(30) Foreign Application Priority Data
Mar. 23, 2018 (JP) .................. 2018-056640

(51) Int. Cl.
| G01S 7/481 | (2006.01) |
| G01S 17/93 | (2020.01) |
| H05B 3/84 | (2006.01) |
| G01S 17/931 | (2020.01) |
| H01Q 1/02 | (2006.01) |

(52) U.S. Cl.
CPC .......... *G01S 7/4813* (2013.01); *G01S 7/4817* (2013.01); *G01S 17/93* (2013.01); *G01S 17/931* (2020.01); *H05B 3/845* (2013.01); *H01Q 1/02* (2013.01)

(58) Field of Classification Search
CPC ......... G01S 2013/93275; G01S 7/4813; G01S 7/4811; G01S 17/93; H05B 3/845; G01J 5/04; G06K 9/00805; G06K 9/00362; B60R 19/483; B60R 19/02
See application file for complete search history.

(56) References Cited

U.S. PATENT DOCUMENTS

| 4,956,542 A * | 9/1990 | Prosser .................. H05B 3/845 219/219 |
| 6,674,392 B1 * | 1/2004 | Schmidt ................ G01S 13/931 342/70 |
| 7,166,819 B2 * | 1/2007 | Winter ...................... B60S 1/54 219/202 |
| 2017/0334364 A1 * | 11/2017 | Usami .................... G03B 17/55 |

FOREIGN PATENT DOCUMENTS

| EP | 0505225 | * | 3/1992 |
| JP | 2005-268015 A | | 9/2005 |

* cited by examiner

*Primary Examiner* — Yara B Green
(74) *Attorney, Agent, or Firm* — Posz Law Group, PLC

(57) ABSTRACT

There is provided a near-infrared sensor cover to be applied to a near-infrared sensor including a transmitting unit that transmits near-infrared radiation and a receiving unit that receives near-infrared radiation reflected by an object. The near-infrared sensor cover includes a cover main body portion disposed with a thickness direction thereof to be coincide with a transmission and reception direction of the near-infrared radiation and covering the transmitting unit and the receiving unit, and a heater wire disposed on the cover main body portion to generate heat when energized. The heater wire includes plural straight line portions that extend in parallel to each other and plural connection portions that connect end portions of adjacent straight line portions. An interval between adjacent straight line portions ranges from 3 mm to 10 mm, and a diameter of the heater wire ranges from 0.01 mm to 0.2 mm.

3 Claims, 7 Drawing Sheets

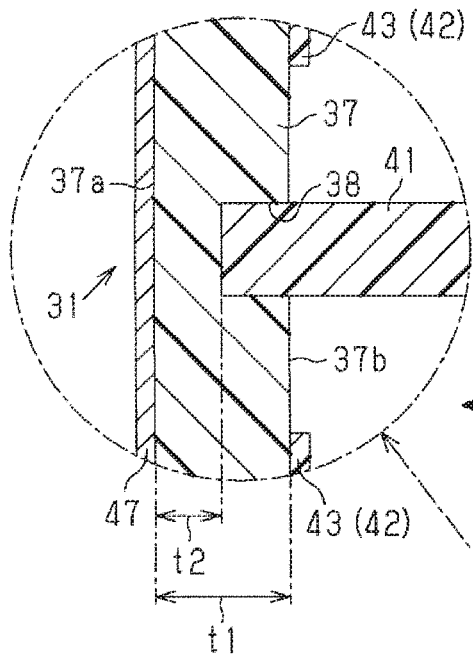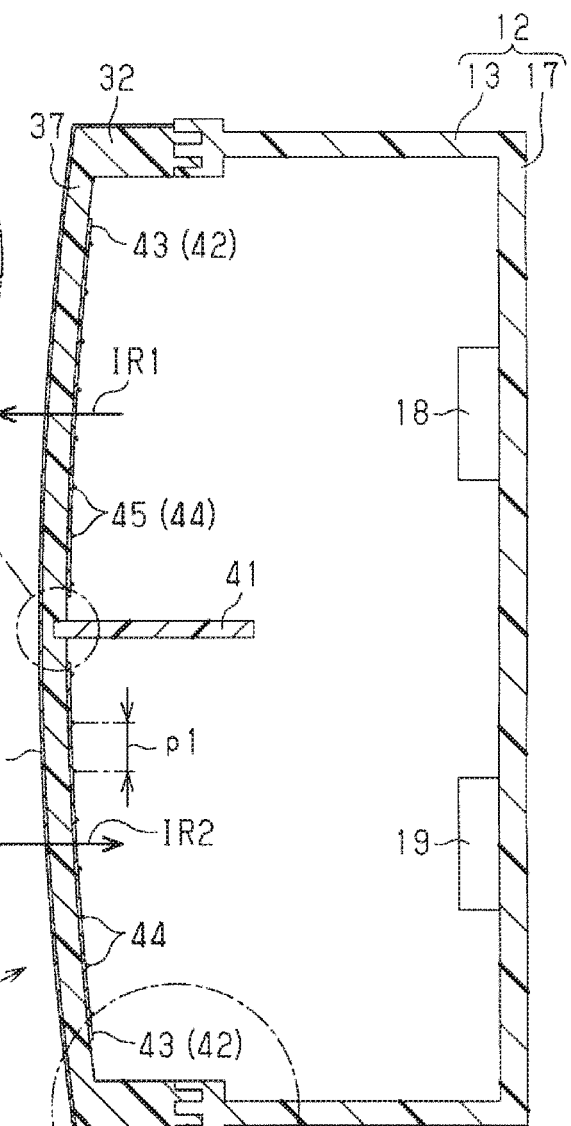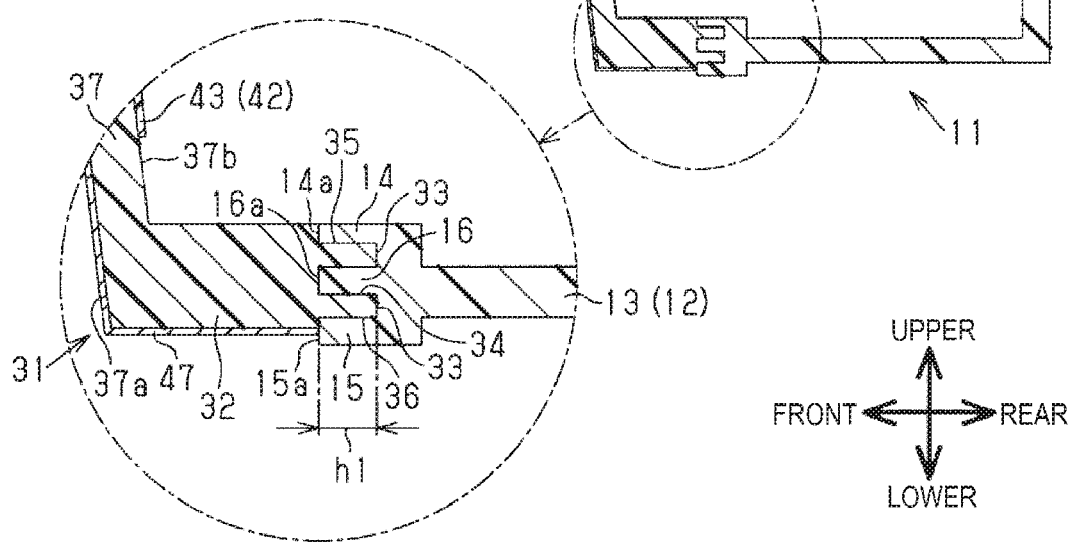

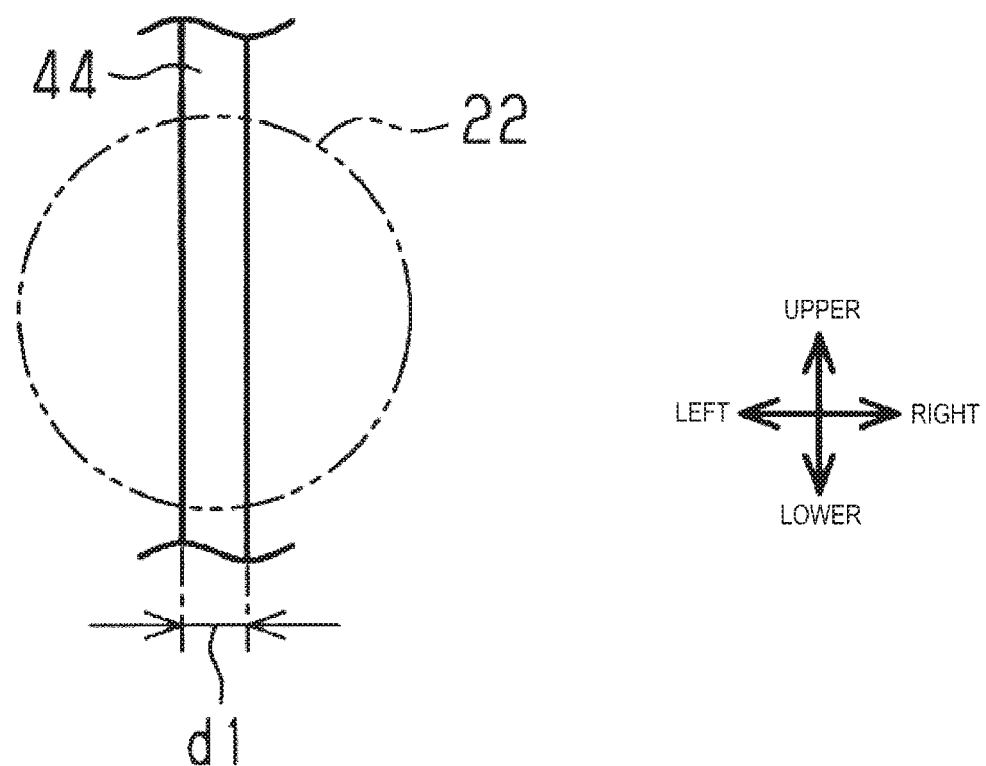

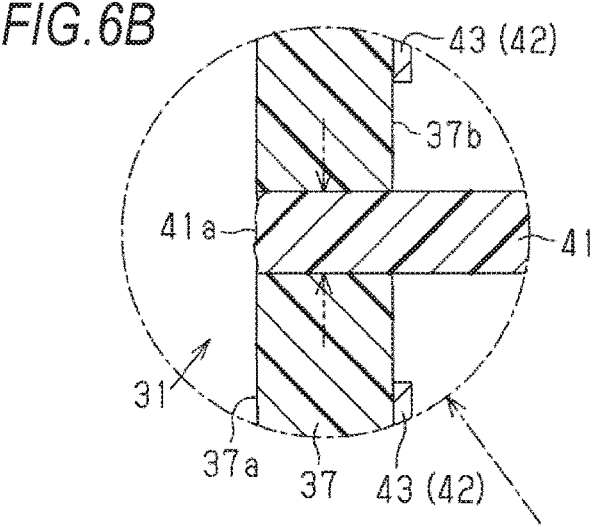
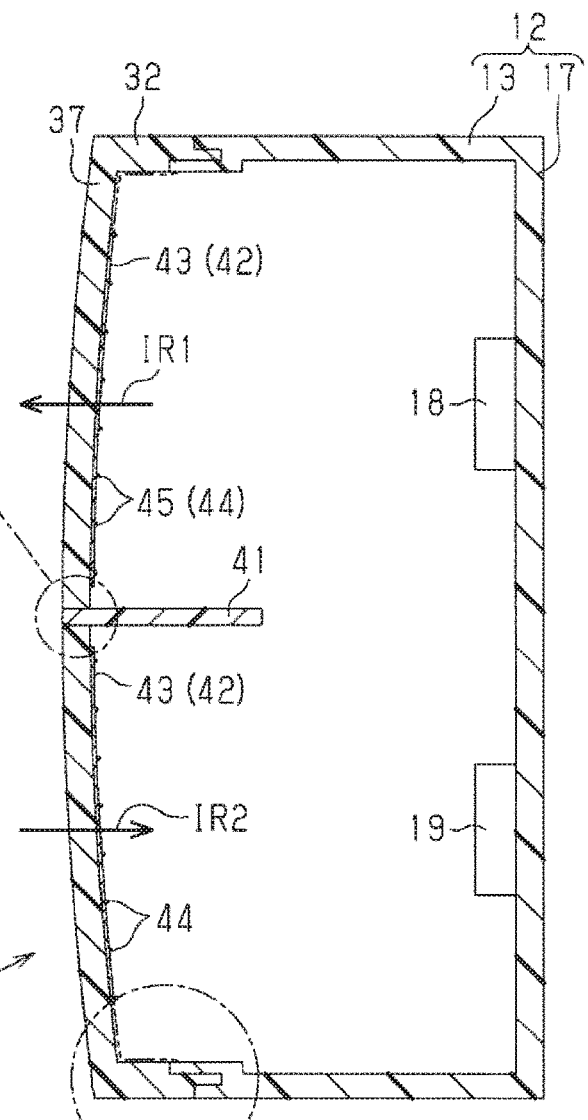
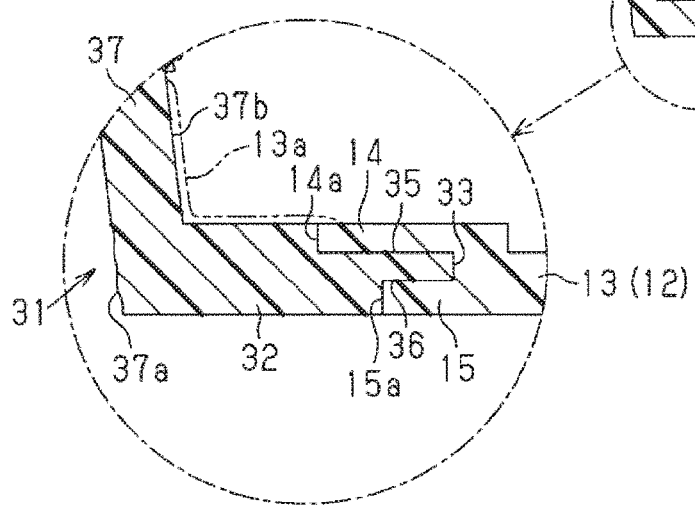
FIG.6B
FIG.6A
FIG.6C

NEAR-INFRARED SENSOR COVER

CROSS-REFERENCE TO RELATED APPLICATION

This application claims priority from Japanese Patent Application No. 2018-056640, filed on Mar. 23, 2018, the entire subject matter of which is incorporated herein by reference.

TECHNICAL FIELD

The present invention relates to a near-infrared sensor cover that covers a near-infrared transmitting unit and a near-infrared receiving unit of a near-infrared sensor.

BACKGROUND ART

A near-infrared radar device may be provided in a vehicle so as to detect a distance from or a relative speed with respect to an object including a preceding vehicle, a pedestrian, and the like using near-infrared radiation. A near-infrared sensor constituting a part of the near-infrared radar device includes a near-infrared transmitting unit and a near-infrared receiving unit. The transmitting unit and the receiving unit are covered with a near-infrared sensor cover through which near-infrared radiation penetrates. In the near-infrared sensor, near-infrared radiation is transmitted from the transmitting unit to outside of the vehicle through the near-infrared sensor cover. Near-infrared radiation reaching and reflected by the object outside the vehicle is received by the receiving unit through the near-infrared sensor cover. The distance or the relative speed is detected via the transmission and reception of near-infrared radiation.

In the near-infrared radar device, when snow is attached to the near-infrared sensor cover, the detection is temporarily stopped since the transmission of near-infrared radiation is prevented. However, the detection is desired to be performed even during snowfall with spread of the near-infrared radar device.

Accordingly, it is considered to dispose a heater wire on the near-infrared sensor cover, so that the snow is melted by heat generated by the energized heater wire (see, for example, JP-A-2005-268015).

However, the near-infrared radiation may be irradiated to the heater wire and reflected when the heater wire is wired to the near-infrared sensor cover as described in JP-A-2005-268015 since the heater wire is formed of metal. The near-infrared radiation penetrating through the near-infrared sensor cover is reduced by an amount of the reflected near-infrared radiation, which may affect a detection function of the near-infrared sensor.

SUMMARY

Accordingly, an aspect of the present invention provides a near-infrared sensor cover capable of improving transparency of near-infrared radiation while having a snow melting function.

According to an embodiment of the present invention, there is provided a near-infrared sensor cover to be applied to a near-infrared sensor including a transmitting unit configured to transmit near-infrared radiation to outside of a vehicle and a receiving unit configured to receive near-infrared radiation reaching and reflected by an object outside the vehicle. The near-infrared sensor cover includes a plate-shaped cover main body portion disposed with a thickness direction thereof to be coincide with a transmission and reception direction of the near-infrared radiation and covering the transmitting unit and the receiving unit, and a heater wire disposed on one side of the cover main body portion in the thickness direction and configured to generate heat when energized, wherein the heater wire includes a plurality of straight line portions that extend in parallel to each other and a plurality of connection portions that connect end portions of adjacent straight line portions, and wherein an interval between adjacent straight line portions ranges from 3 mm to 10 mm, and a diameter of the heater wire ranges from 0.01 mm to 0.2 mm.

According to the above configuration, near-infrared radiation is transmitted from the transmitting unit of the near-infrared sensor to outside of the vehicle through the near-infrared sensor cover. Near-infrared radiation reaching and reflected by the object outside the vehicle is received by the receiving unit through the near-infrared sensor cover.

The heater wire generates heat when energized. Therefore, even if snow is attached to the near-infrared sensor cover, the snow is melted by heat generated by the heater wire when energized.

Here, the heater wire disposed on one side of the cover main body portion in the thickness direction prevents the near-infrared radiation from penetrating through the near-infrared sensor cover. The near-infrared radiation irradiated to the heater wire is reflected. As an amount (reflection amount) of reflected near-infrared radiation increases, an amount of near-infrared radiation penetrating through the near-infrared sensor cover decreases, so that a detection function of the near-infrared sensor decreases.

In a case where the heater wire includes the plurality of straight line portions and the plurality of connection portions as in the above configuration, the amount (reflection amount) of near-infrared radiation reflected by the heater wire is greatly affected by the interval (pitch) of adjacent straight line portions and the diameter of the heater wire. As the interval increases and the diameter decreases, the reflection amount of near-infrared radiation due to the heater wire decreases, and the near-infrared radiation penetrating through the near-infrared sensor cover increases. Meanwhile, an amount of heat generated by the heater wire decreases, and a snow-melting function decreases.

In this regard, as in the above configuration, a necessary snow-melting function can be ensured by setting the interval between adjacent straight line portions to 3 mm to 10 mm and setting the diameter of the heater wire to 0.01 mm to 0.2 mm. Further, the amount (reflection amount) of near-infrared radiation reflected by the heater wire is restricted to an allowable value. Then, the near-infrared radiation of an amount necessary for the near-infrared sensor to properly perform the detection function penetrates through the near-infrared sensor cover.

In the near-infrared sensor cover, the transmitting unit may be configured to transmit near-infrared radiation by scanning a beam along a scanning path. The scanning path may include a plurality of main paths that extend in parallel with each other, and a plurality of sub-paths that connect end portions of adjacent main paths. The straight line portions of the heater wire may be disposed to extend along the main paths of the scanning path.

According to the above configuration, near-infrared radiation is less likely to hit the heater wire by extending the straight line portions of the heater wire along the main paths of the scanning path, so that an amount (reflection amount) of near-infrared radiation reflected by the heater wire is easily restricted to an allowable value.

In the near-infrared sensor cover, the straight line portions of the heater wire may be disposed in parallel to the main paths of the scanning path.

According to this configuration, near-infrared radiation is less likely to hit the heater wire by disposing the straight line portions of the heater wire in parallel to the main paths of the scanning path.

According to the above-described near-infrared sensor cover, it is possible to improve transparency of near-infrared radiation while having a snow-melting function.

BRIEF DESCRIPTION OF DRAWINGS

FIG. 1A is a side cross-sectional view of a near-infrared sensor including a near-infrared sensor cover according to an embodiment, and FIGS. 1B and 1C are enlarged partial side cross-sectional views of FIG. 1A.

FIG. 5 is a front view illustrating a relationship between a part of the heater wire and a beam according to an embodiment.

FIG. 6A is a side cross-sectional view of a near-infrared sensor including a near-infrared sensor cover according to a comparative example, and FIGS. 6B and 6C are partial enlarged side cross-sectional views of FIG. 6A.

DESCRIPTION OF EMBODIMENTS

Hereinafter, an embodiment of a near-infrared sensor cover is described with reference to FIGS. 1A to 6C. In the following description, a forward direction of a vehicle is described as front, and a backward direction is described as rear. An upper-lower direction indicates an upper-lower direction of the vehicle, and a left-right direction, which is a vehicle width direction, coincides with a left-right direction of the vehicle during forward movement.

Figure 2:
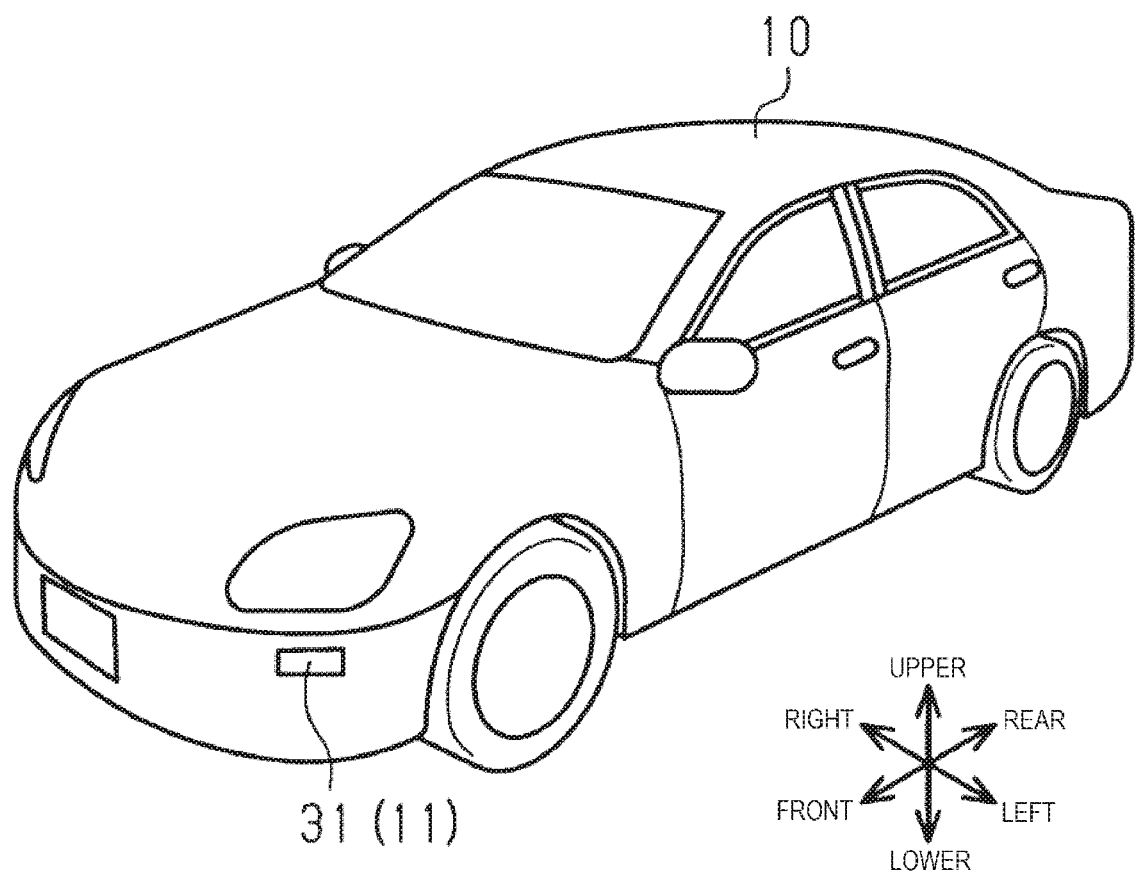
FIG. 2 is a perspective view of a vehicle to which a near-infrared sensor cover according an embodiment is applied.

As illustrated in FIGS. 1 and 2, near-infrared sensors 11 are attached to four corners (right front portion, left front portion, right rear portion, and left rear portion) of a vehicle 10 in a plan view. FIG. 2 illustrates only the near-infrared sensor 11 attached to the left front portion of the vehicle 10. The near-infrared sensors 11 in the four corners have the same configuration. Therefore, only the near-infrared sensor 11 attached to the left front portion of the vehicle 10 is described below, and descriptions of the other three near-infrared sensors 11 are omitted.

The near-infrared sensor 11, which is a component constituting a part of a near-infrared radar device, detects a distance from or a relative speed with respect to an object including a preceding vehicle, a pedestrian, and the like by transmitting near-infrared radiation IR1 toward front of the vehicle 10 and receiving near-infrared radiation IR2 reaching and reflected by the object outside the vehicle. The detection result is used for collision damage reduction control, erroneous start inhibition control, and the like.

Infrared radiation is a kind of electromagnetic waves and has a wavelength longer than a wavelength of visible light (0.36 μm to 0.83 μm). The near-infrared radiation IR1, IR2 has a shortest wavelength (0.83 μm to 3 μm) in the infrared radiation.

There is a millimeter-wave radar device having a function similar to that of the near-infrared radar device. The millimeter-wave radar device irradiates millimeter waves toward front of the vehicle 10 in a prescribed angle range and detects an inter-vehicle distance from or a relative speed with respect to a preceding vehicle traveling in front of the vehicle 10 from a time difference between transmitted waves and received waves, strength of the received waves, and the like.

The near-infrared sensor 11 in the near-infrared radar device irradiates the near-infrared radiation IR1 in an angle range wider than that in the millimeter wave radar device. Further, the near-infrared sensor 11 detects an object at a distance closer than that in the millimeter wave radar device.

A rear half portion of an outer shell of the near-infrared sensor 11 is constituted by a case 12, and a front half portion is constituted by a cover. The near-infrared sensor 11 is fixed to a body of the vehicle 10.

The case 12 includes a tubular peripheral wall portion 13 and a bottom wall portion 17 at a rear end portion of the peripheral wall portion 13, and has a bottomed tubular shape with a front side opened. As illustrated in FIG. 1C, a protruding inner annular portion 14 protrudes forward from an inner periphery at a front end of the peripheral wall portion 13. A protruding outer annular portion 15 protrudes forward from an outer periphery at the front end of the peripheral wall portion 13. A protruding intermediate annular portion 16 protrudes forward from a front end portion of the peripheral wall portion 13 while being separated from the protruding inner annular portion 14 and the protruding outer annular portion 15. Protruding heights h1 of the protruding inner annular portion 14, the protruding intermediate annular portion 16, and the protruding outer annular portion 15 equal to each other, so that front end surfaces 14a, 16a, 15a are on the same plane in the front-rear direction. The protruding heights h1 are preferably 0.7 mm or more. This is to ensure contact (close contact) areas with an inner annular stepped portion 35, an intermediate annular recess 34, and an outer annular stepped portion 36 which are described below.

The case 12 configured as described above is formed of polybutylene terephthalate (PBT) that is a resin material that hardly transmits light including the near-infrared radiation IR1, IR2. A transmitting unit 18 that transmits the near-infrared radiation IR1 is attached to a front surface of the bottom wall portion 17 above an intermediate portion of the front surface in the upper-lower direction. A receiving unit 19 that receives the near-infrared radiation IR2 is attached below the intermediate portion.

Figure 3:
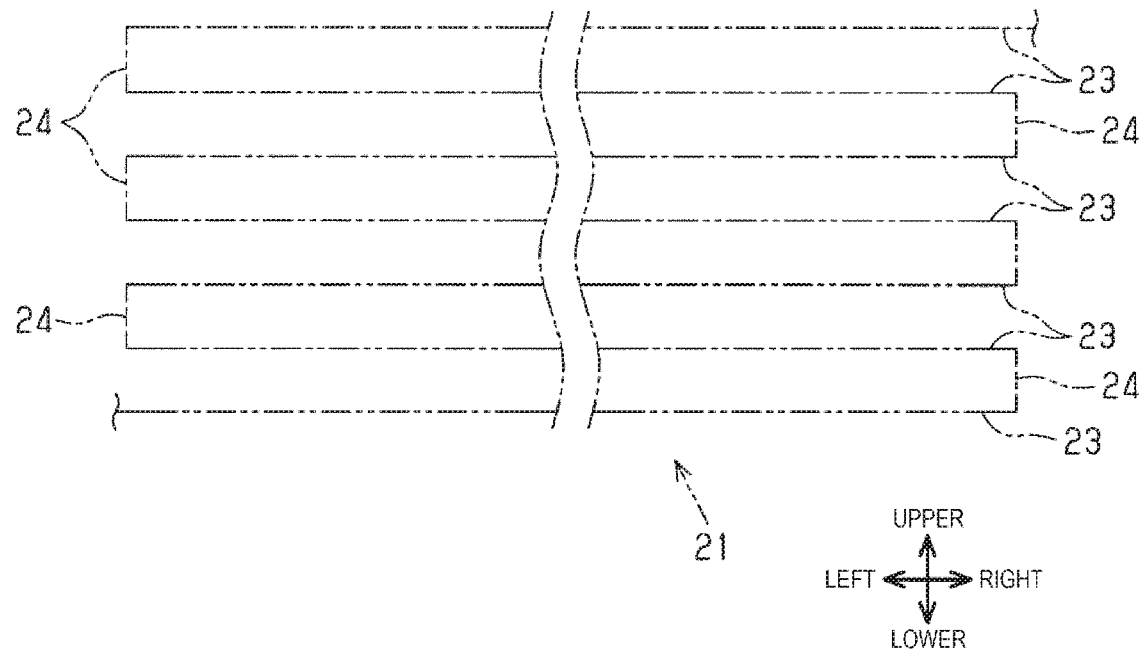
FIG. 3 is a front view illustrating a scanning path of a beam according to an embodiment with a part thereof omitted.

The transmitting unit 18 transmits the near-infrared radiation IR1 by scanning a beam 22 (see a two-dot chain line in FIG. 5) along a scanning path 21 in FIG. 3. The scanning path 21 includes a plurality of main paths 23 extending in the vehicle width direction while being spaced parallel to each other in the upper-lower direction, and a plurality of sub-paths 24 connecting ends of adjacent main paths 23.

As illustrated in FIG. 1A, the cover of the near-infrared sensor 11 is constituted by a near-infrared sensor cover 31. The near-infrared sensor cover 31 includes a tubular peripheral wall portion 32 and a plate-shaped cover main body portion 37 at a front end portion of the peripheral wall portion 32.

As illustrated in FIG. 1C, an intermediate annular recess 34, which is a rear end portion of the peripheral wall portion 32 and is recessed forward from the rear end surface 33 of the same rear end portion, is formed in an intermediate portion in an inner-outer direction of the peripheral wall portion 32. An inner annular stepped portion 35 extending forward from the rear end surface 33 of the rear end portion of the peripheral wall portion 32 is formed at a corner in an inner periphery of the same rear end portion while being separated from the intermediate annular recess 34 toward the inner periphery. An outer annular stepped portion 36 extending forward from the rear end surface 33 of the rear end portion of the peripheral wall portion 32 is formed at a corner in an outer periphery of the same rear end portion while being separated from the intermediate annular recess 34 toward the outer periphery.

The intermediate annular protrusion 16 enters the intermediate annular recess 34 and is in close contact therewith. The protruding inner annular portion 14 is engaged with the inner annular stepped portion 35 and is in close contact therewith. The protruding outer annular portion 15 is engaged with the outer annular stepped portion 36 and is in close contact therewith.

As illustrated in FIG. 1A, the cover main body portion 37 has a minimum size for closing a front end opening of the peripheral wall portion 13. The cover main body portion 37 is located in front of the bottom wall portion 17 and covers the transmitting unit 18 and the receiving unit 19 from front.

A thickness direction of the cover main body portion 37 substantially coincides with the front-rear direction of the vehicle 10. The near-infrared radiation IR1, IR2 penetrates through in the thickness direction of the cover main body portion 37.

As illustrated in FIG. 1B, a groove 38 extending in the vehicle width direction is formed in a substantially intermediate portion of a rear surface 37b of the cover main body portion 37 in the upper-lower direction. The groove 38 crosses over a substantially entire width of the cover main body portion 37 in the vehicle width direction. A thickness t2 of a part of the cover main body portion 37 in front of the groove 38 is equal to or less than ½ of a thickness t1 of a part of the cover main body portion 37 without the groove 38. In the present embodiment, the thickness t1 is 2 mm, while the thickness t2 is 1 mm.

The cover main body portion 37 and the peripheral wall portion 32 are formed of polycarbonate (PC), which is a transparent resin material, and may also be formed of a transparent resin material such as polymethyl methacrylate (PMMA) and cycloolefin polymer (COP).

As illustrated in FIGS. 1A and 1B, a front end portion of a partition plate 41 formed of a PC (polycarbonate) is press-fitted into the groove 38. The partition plate 41 is separated from the case 12 and the cover main body portion 37.

A heater unit 42 is disposed on a rear side of the cover main body portion 37 in the thickness direction. The heater unit 42 includes a resin sheet 43 and a heater wire 44 on the resin sheet 43. The resin sheet 43 may be formed of, for example, a transparent resin material such as PC (polycarbonate). The heater wire 44 may be formed by, for example, printing a nichrome wire, a carbon heating body, a silver paste, and the like.

Figure 4:
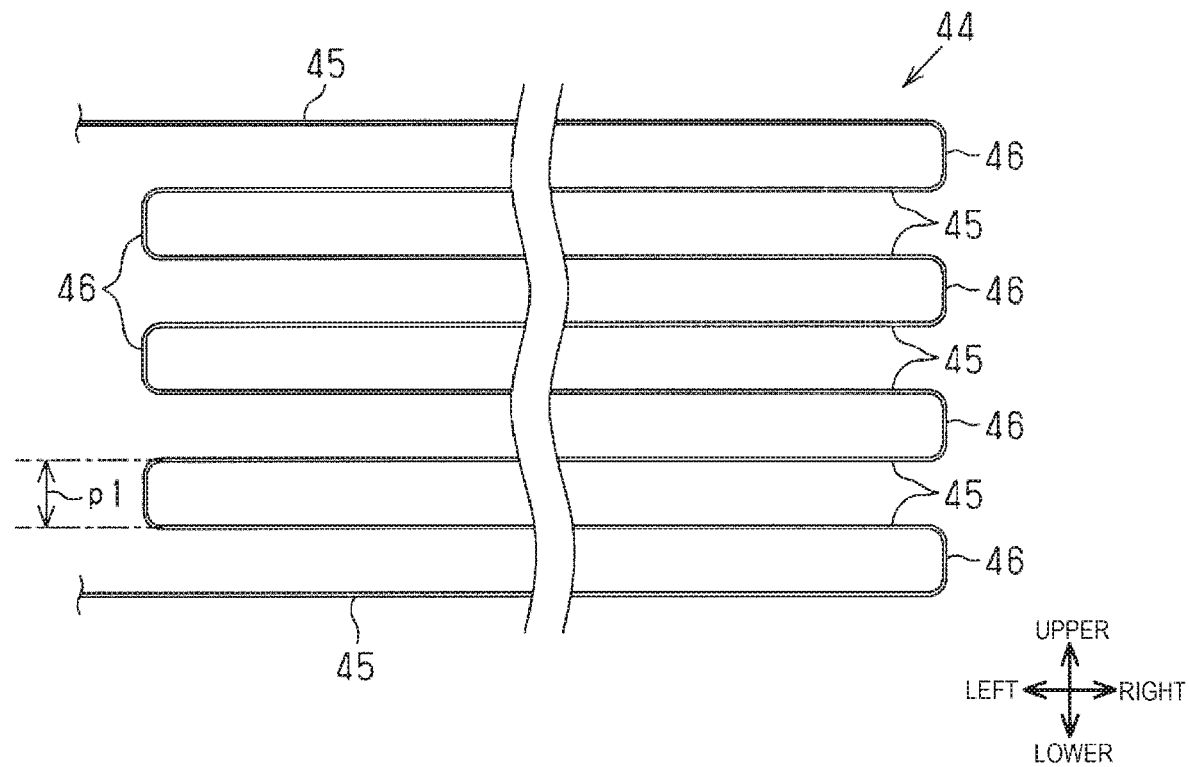
FIG. 4 is a front view illustrating a part of a heater wire according to an embodiment with a part thereof omitted.

As illustrated in FIGS. 4 and 5, the heater wire 44 includes a plurality of straight line portions 45 and a plurality of connection portions 46. The plurality of straight line portions 45 extend parallel to each other in the upper-lower direction. The plurality of connection portions 46 connect ends of adjacent straight line portions 45. An interval p between adjacent straight line portions 45 ranges from 3 mm to 10 mm. In the present embodiment, the interval p1 is 6.7 mm. A diameter d1 of the heater wire 44 ranges from 0.01 mm to 0.2 mm. In the present embodiment, the diameter d1 is 0.08 mm.

The straight line portions 45 are preferably disposed to extend along the main paths 23 (see FIG. 3) of the scanning path 21. In the present embodiment, the straight line portions 45 are disposed to extend in the vehicle width direction, that is, to be parallel to the main paths 23.

As illustrated in FIGS. 1A to 1C, a water-repellent layer 47 is formed on a front surface of the cover main body portion 37 and an outer peripheral surface of the peripheral wall portion 32. The water-repellent layer 47 is made of an organic coating film, a silicone film, or the like.

Light transmittance of the near-infrared radiation IR1, IR2 in the near-infrared sensor cover 31 is 60% or more, and surface reflectance is 30% or less. Next, operational effects of the present embodiment configured as described above are described.

As illustrated in FIG. 1A, the near-infrared radiation IR1 penetrates through the cover main body portion 37 of the near-infrared sensor cover 31 after being transmitted from the transmitting unit 18 of the near-infrared sensor 11.

At this time, the partition plate 41 restricts the near-infrared radiation IR1 transmitted from the transmitting unit 18 from being irradiated to a part of the cover main body portion 37 lower than the groove 38. Further, a part of the cover main body portion 37 is located in front of the partition plate 41. The near-infrared radiation IR1 may penetrate through the part of the cover main body portion 37 and scatters. However, in the present embodiment, the thickness t2 of the part of the cover main body portion 37 in front of the groove 38 is small and is equal to or less than ½ of the thickness t1 of the part without the groove 38. Therefore, the near-infrared radiation IR1 can penetrate through the part of the cover main body 37 without scattering.

The near-infrared radiation IR1 penetrating through the cover main body portion 37 reaches and is reflected by an object including a preceding vehicle, a pedestrian, and the like. The reflected near-infrared radiation IR2 again penetrates through the cover main body portion 37 and is received by the receiving unit 19. A distance from or a relative speed with respect to the preceding vehicle, the pedestrian, and the like is detected via transmission and reception of the near-infrared radiation IR1, IR2 by the near-infrared sensor 11.

Meanwhile, the heater wire 44 generates heat when energized. Therefore, the heater wire 44 is energized to generate heat during snowfall. Then, snow is inhibited from being attached to the near-infrared sensor cover 31. Even if snow is attached to the near-infrared sensor cover 31, the snow is melted by heat generated from the heated heater wire 44.

Here, the heater wire 44 disposed on the rear side of the cover main body portion 37 in the thickness direction prevents the near-infrared radiation IR1, IR2 from penetrating through the near-infrared sensor cover 31. The near-infrared radiation IR1, IR2 irradiated to the heater wire 44 is reflected. As an amount (reflection amount) of reflected near-infrared radiation IR, IR2 increases, an amount of near-infrared radiation IR1, IR2 penetrating through the near-infrared sensor cover 31 decreases, and a detection function of the near-infrared sensor 11 decreases.

In the present embodiment in which the heater wire 44 includes the plurality of straight line portions 45 and the plurality of connection portions 46, the amount (reflection amount) of near-infrared radiation IR1, IR2 reflected by the heater wire 44 is greatly affected by the interval (pitch) p1 of adjacent straight line portions 45 and the diameter d1 of the heater wire 44. As the interval p increases and the diameter d1 decreases, the reflection amount of near-infrared radiation IR1, IR2 due to the heater wire 44 decreases, and the near-infrared radiation IR1, IR2 penetrating through the near-infrared sensor cover 31 increases. Meanwhile, an amount of heat generated by the heater wire 44 decreases, and a snow-melting function decreases.

In this regard, as in the present embodiment, a necessary snow-melting function can be ensured by setting the interval p1 between adjacent straight line portions 45 to a value (6.7 mm) satisfying 3 mm to 10 mm and setting the diameter d1 of the heater wire 44 to a value (0.08 mm) satisfying 0.01 mm to 0.2 mm. Further, the amount (reflection amount) of near-infrared radiation IR1, IR2 reflected by the heater wire 44 can be restricted to an allowable value. Then, the near-infrared radiation IR1, IR2 of an amount necessary for the near-infrared sensor 11 to properly perform the detection function can penetrate through the near-infrared sensor cover 31.

The water-repellent layer 47 on the front surface of the cover main body portion 37 and the outer peripheral surface of the peripheral wall portion 32 repels water attached to the front surface of the near-infrared sensor cover 31, making the near-infrared sensor cover 31 less likely to be wet. Therefore, with the water repellent layer 47, it is possible to inhibit a film of water on the front surface of the cover main body portion 37 during snow melting.

Reasons why the front end portion of the peripheral wall portion 13 of the case 12 and the rear end portion of the peripheral wall portion 32 of the near-infrared sensor cover 31 have the above shapes and why the partition plate 41 is attached to the groove 38 are as follows.

As described above, airtightness is required in the near-infrared sensor 11 whose rear half portion is constituted by the case 12 and the front half portion is constituted by the near-infrared sensor cover 31. Therefore, as illustrated in a comparative example in FIGS. 6A to 6C, it is considered to mold the case 12 using an insert mold in which the partition plate 41 is disposed, and to mold (insert molding) the near-infrared sensor cover 31 using the case 12 and the partition plate 41 as inserts. In the comparative example, members common to the present embodiment are denoted by the same reference numerals as in the present embodiment. The water-repellent layer 47 is omitted in FIGS. 6A to 6C.

As illustrated in FIG. 6C, the protruding inner annular portion 14 protrudes forward from an inner periphery at a front end of the peripheral wall portion 13 of the case 12. The protruding outer annular portion 15 protrudes forward from an outer periphery at the front end of the peripheral wall portion 13 while being separated from the protruding inner annular portion 14 toward an outer periphery. The protruding inner annular portion 14 protrudes further than the protruding outer annular portion 15.

The inner annular stepped portion 35, which serves as the peripheral wall portion 32 of the near-infrared sensor cover 31 and extends forward from the rear end surface 33 of a rear end portion of the peripheral wall portion 32, is formed at a corner in an inner periphery of the same rear end portion of the peripheral wall portion 32. The outer annular stepped portion 36 extending forward from the rear end surface 33 is formed at a corner in an outer periphery of the rear end portion of the peripheral wall portion 32 while being separated from the inner annular stepped portion 34 toward the outer periphery.

The protruding inner annular portion 14 is engaged with the inner annular stepped portion 35 and is in close contact therewith. The protruding outer annular portion 15 is engaged with the outer annular stepped portion 36 and is in close contact therewith. As illustrated in FIG. 6B, a front end surface 41a of the partition plate 41 is exposed to a front surface 37a of the cover main body portion 37 of the near-infrared sensor cover 31.

In the comparative example in FIGS. 6A to 6C having the above configuration, the partition plate 41 is primarily disposed in the insert mold. Next, the case 12 including the protruding inner annular portion 14 and the protruding outer annular portion 15 is formed at a front end of the peripheral wall portion 13. Subsequently, the near-infrared sensor cover 31 including the inner annular stepped portion 35 and the outer annular stepped portion 36 is insert-molded at the rear end portion of the peripheral wall portion 32, with the case 12 and the partition plate 41 being used as inserts. When the near-infrared sensor cover 31 is molded, as indicated by a two-dot chain line arrow in FIG. 6B, heat and pressure of molten resin are applied to the partition plate 41 from both upper and lower sides thereof. The partition plate 41 may be deformed and the front end surface 41a may be distorted under an influence of the heat and the pressure.

As illustrated in FIG. 6C, when the near-infrared sensor cover 31 is molded, the heat and the pressure of the molten resin are applied to a front end portion of the peripheral wall portion 13 of the case 12. The front end portion of the peripheral wall portion 13 is melted under the influence of the heat and the pressure. Under an influence of the melting, a front part of the peripheral wall portion 13 of the case 12, that is, the front surface 37a of the near-infrared sensor cover 31, may be distorted. Further, a melted portion 13a of the peripheral wall portion 13 may flow to the rear surface 37b of the cover main body portion 37, as indicated by a two-dot chain line in FIG. 6C. Transparency of the near-infrared radiation IR1, IR2 in the near-infrared sensor cover 31 decreases due to the melted portion 13a since the PBT as the material of the case 12 hardly transmits the near-infrared radiation IR1, IR2.

As described above, detection accuracy of the near-infrared sensor 11 may decrease when the front end surface 41a of the partition plate 41 or the front surface 37a of the cover portion 37 is distorted or the melted portion 13a flows to the rear surface 37b of the cover main body portion 37.

In contrast, in the present embodiment, as illustrated in FIGS. 1A to 1C, the groove 38 is formed during molding of the near-infrared sensor cover 31. In the cover main body portion 37, a part upper than the groove 38 and the part lower than the groove 38 are connected by the part in front of the groove 38. The above molding is performed without the partition plate 41. Therefore, unlike the comparative example in FIGS. 6A to 6C, the heat and the pressure of the molten resin are not applied to the partition plate 41 from neither the upper nor the lower sides thereof. The partition plate 41 is not deformed under the influence of the heat and the pressure. Therefore, it is possible to inhibit distortion of the front surface 41a of the partition plate 41 and the front surface 37a of the cover main body portion 37 in front of the groove 38.

In the cover main body portion 37, the part upper than the groove 38 and the part lower than the groove 38 are connected by the part in front of the groove 38. At this time, the part of the cover main body portion 37 in front of the groove 38 may be deformed or distorted since molten resin flowing from the part upper than the groove 38 to the part lower than the groove 38 collides with molten resin flowing from the part lower than the groove 38 to the part upper than the groove 38. However, as described above, the thickness t2 of the part in front of the groove 38 in the present embodiment is equal to or less than ½ of the thickness t1 of the part without the groove 38. Therefore, it is possible to inhibit deformation or distortion of the part of the cover main body portion 37 in front of the groove 38.

The partition plate 41 is press-fitted into the groove 38 after the molding of the near-infrared sensor cover 31. The front end of the protruding inner annular portion 14 in the present embodiment is retreated rearward farther than that in the comparative example in FIGS. 6A to 6C, and the front end surface 14a of the protruding inner annular portion 14, the front end surface 16a of the protruding intermediate annular portion 16, and the front end surface 15a of the protruding outer annular portion 15 are located on the same plane in the front-rear direction. The protruding inner annular portion 14, the protruding intermediate annular portion 16, and protruding outer annular portion 15 are located rearward from the front surface 37a of the cover main body portion 37 farther than those in the comparative example. Therefore, the front surface 37a is less likely to be distorted when the near-infrared sensor cover 31 is molded even when the heat and the pressure of the molten resin are applied to the front end portion of the peripheral wall portion 13 of the case 12 and the front end portion of the peripheral wall portion 13 is melted. Further, the melted portion 13a of the peripheral wall portion 13 is less likely to flow to the rear surface 37b of the cover main body portion 37. Accordingly, it is possible to inhibit a decrease in the transparency due to the melted portion 13a located on the rear surface 37b of the cover main body portion 37.

A contact area of the rear end portion of the peripheral wall portion 32 and the front end portion of the peripheral wall portion 13 is larger as compared with a case where the rear end portion of the peripheral wall portion 32 of the near-infrared sensor cover 31 has the same shape as the comparative example in FIGS. 6A to 6C. This is because the protruding intermediate annular portion 16 is engaged with the intermediate annular recess 34. Therefore, a contact force between the rear end portion of the peripheral wall portion 32 and the front end portion of the peripheral wall portion 13 can be increased.

The above embodiment can also be implemented as a modification modified as follows. Generally, radiation intensity of the beam 22 tends to be highest in a center and decreases as going radially away from the center.

Therefore, a part of the heater wire 44 which the near-infrared radiation IR1 hits is preferably disposed at a location satisfying the following condition. The condition is that, as illustrated in FIG. 5, the beam 22 hits the corresponding part of the heater wire 44 in the center.

By disposing the heater wire 44 with the above condition satisfied, the beam 22 hits the heater wire 44 at a part (center) having a high radiation intensity, so that a degree of influence of the heater wire 44 on the detection function of the near-infrared sensor 11 can be reduced.

The heater wire 44 may be used alone and disposed on a rear side of the cover portion 37 instead of being formed on the resin sheet 43. The heater wire 44 may be disposed on a front side of the cover main body portion 37 in a thickness direction that is opposite to that in the above embodiment. In this way, the heater wire 44 is located at a forefront of the near-infrared sensor cover 31. Therefore, heat generated by the heater wire 44 after energization is easily transferred to snow attached to a front surface of the near-infrared sensor cover 31. Therefore, the attached snow can be efficiently melted by the heat of the heater wire 44.

Figure 7:
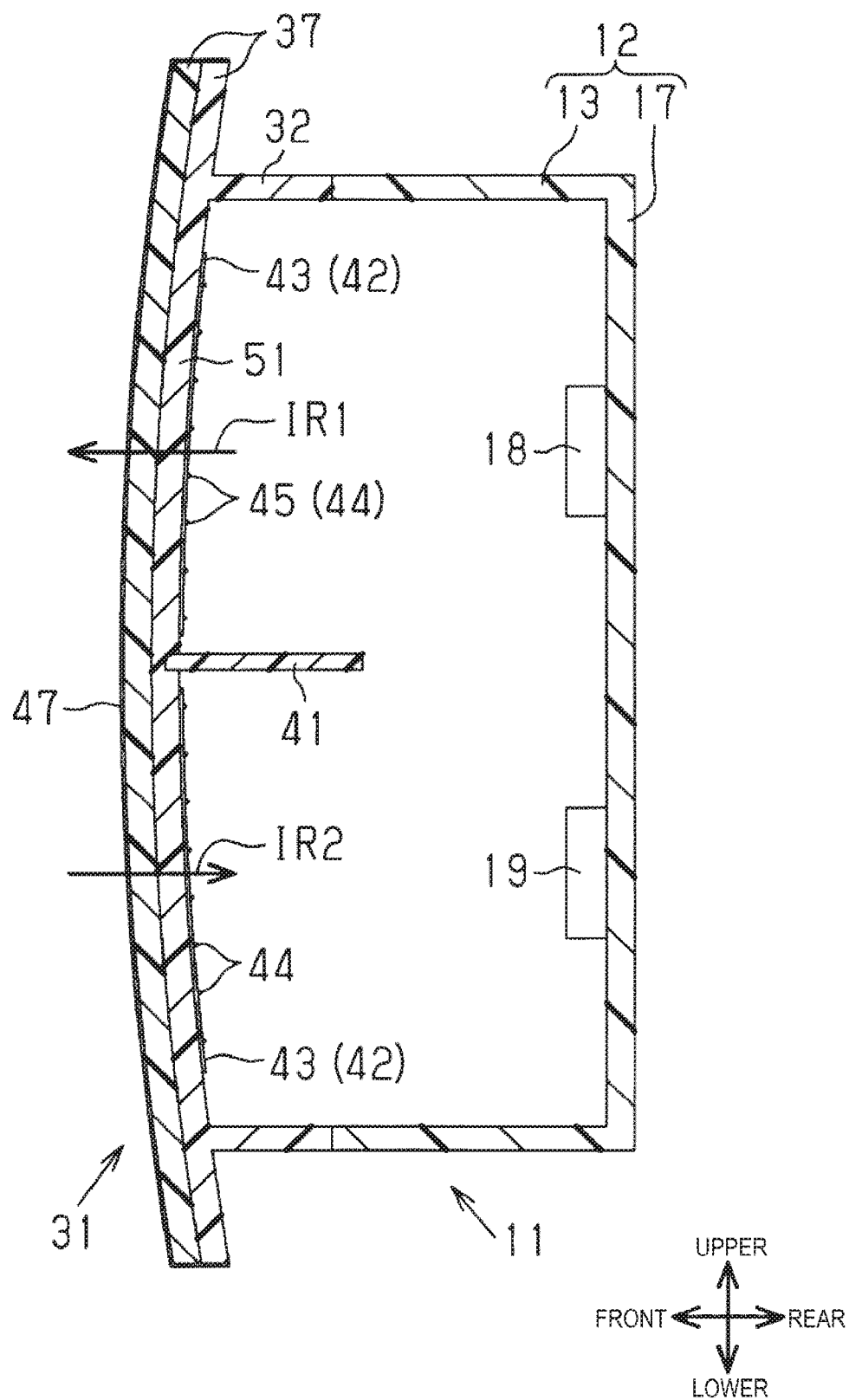
FIG. 7 is a side cross-sectional view illustrating a near-infrared sensor that includes a near-infrared sensor cover according to a modification.

Unlike the above embodiment, the near-infrared sensor cover 31 may be provided with a function as a garnish that decorates a front portion of the vehicle 10. Specifically, as illustrated in FIG. 7, the near-infrared sensor cover 31 includes the tubular peripheral wall portion 32 and the plate-shaped cover main body portion 37 at a front end portion of the peripheral wall portion 32, which is similar to the above embodiment. However, the cover main body portion 37 includes a base member 51 having transparency of near-infrared radiation at a rear portion thereof. The base member 51 is formed of a resin material such as acrylonitrile-ethylene-styrene copolymer (AES) resin.

The cover main body portion 37 has a size larger than that of the cover main body portion 37 in the above embodiment, and more specifically, larger than a front end opening of the peripheral wall portion 13. A periphery of the cover main body portion 37 extends outward from the peripheral wall portion 32. In this case, the heater wire 44 is disposed on a rear surface of the base member 51.

The same operational effects as those in the above embodiment can be obtained even in a case of such changes. The near-infrared sensor cover 31 constitutes a part of the near-infrared sensor 11 in the above embodiment and the modification in FIG. 7. However, as illustrated in FIG. 8, the near-infrared sensor cover 31 may also be provided separately from the near-infrared sensor 11.

That is, the near-infrared sensor 11 includes the case 12 in which the transmitting unit 18 and the receiving unit 19 are assembled, and a cover 52 that is disposed in front of the case 12 and covers the transmitting unit 18 and the receiving unit 19.

Figure 8:
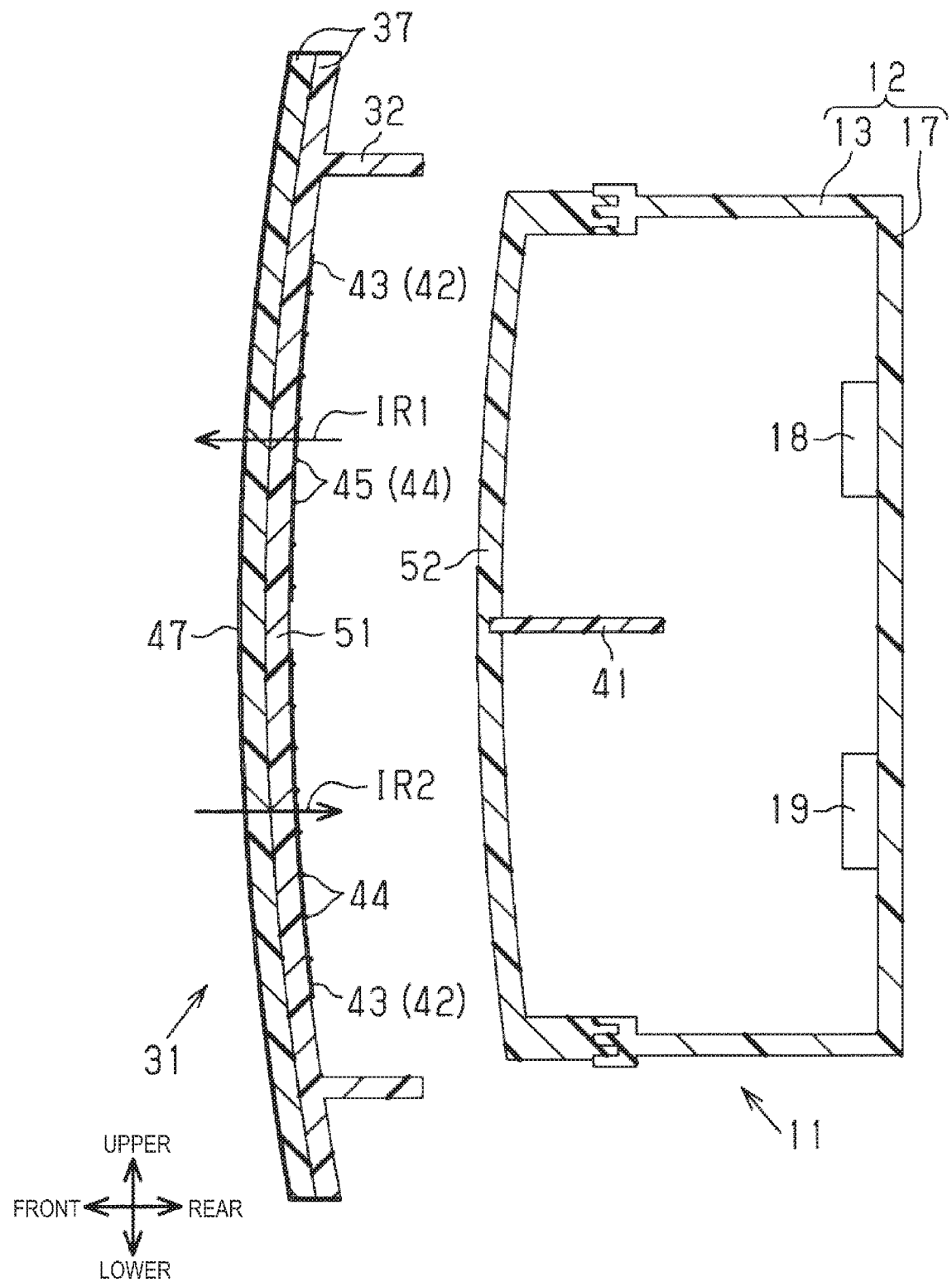
FIG. 8 is a side cross-sectional view illustrating a near-infrared sensor cover according to a modification, which is provided separately from a near-infrared sensor, together with the near-infrared sensor.

In the modification in FIG. 8, the near-infrared sensor cover 31 having the same configuration as that in the modification in FIG. 7 is disposed in front of the cover 52 of the near-infrared sensor 11. In this case, the near-infrared sensor cover 31 is fixed to a body of the vehicle 10 separately from the near-infrared sensor 11.

The same operational effects as those in the above embodiment and the modification in FIG. 7 are also obtained in this case.

The invention claimed is:

1. A near-infrared sensor cover to be applied to a near-infrared sensor including a transmitting unit configured to transmit near-infrared radiation to outside of a vehicle and a receiving unit configured to receive near-infrared radiation reaching and reflected by an object outside the vehicle, the near-infrared sensor cover comprising:
   a plate-shaped cover main body portion disposed with a thickness direction thereof to be coincide with a transmission and reception direction of the near-infrared radiation and covering the transmitting unit and the receiving unit; and
   a heater wire disposed on one side of the cover main body portion in the thickness direction and configured to generate heat when energized,
   wherein the heater wire includes a plurality of straight line portions that extend in parallel to each other and a plurality of connection portions that connect end portions of adjacent straight line portions, and wherein an interval between adjacent straight line portions ranges from 3 mm to 10 mm, and a diameter of the heater wire ranges from 0.01 mm to 0.2 mm.

2. The near-infrared sensor cover according to claim 1, wherein the transmitting unit is configured to transmit the near-infrared radiation by scanning a beam along a scanning path, wherein the scanning path includes a plurality of main paths that extend in parallel with each other, and a plurality of sub-paths that connect end portions of adjacent main paths, and wherein the straight line portions of the heater wire are disposed to extend along the main paths of the scanning path.

3. The near-infrared sensor cover according to claim 2, wherein the straight line portions of the heater wire are disposed in parallel to the main paths of the scanning path.

\* \* \* \* \*